C. P. BOWEN.
Improvement in Governors.
No. 4,931. Reissued June 4, 1872.
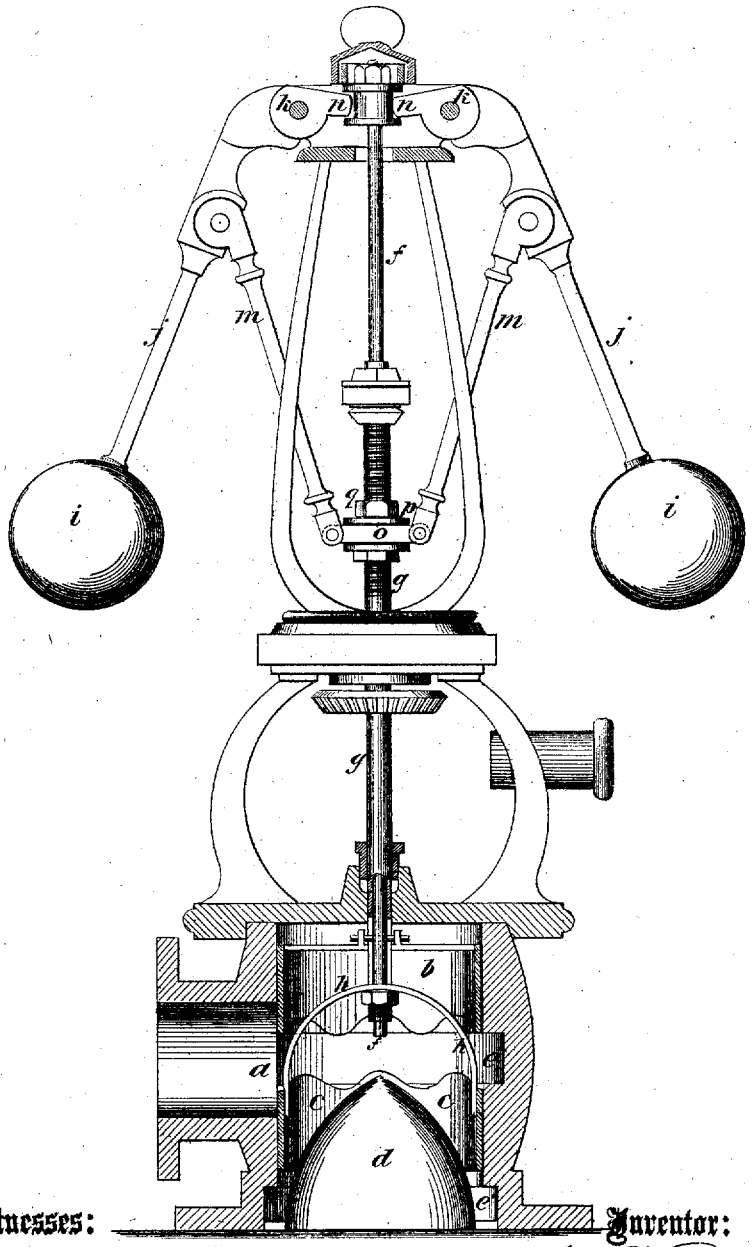
Witnesses:
Gustave Dieterich
Geo W. Mabee
Inventor:
C. P. Bowen
PER Munn & Co.
Attorneys.
A.M. PHOTO-LITHOGRAPHIC CO. N.Y. (OSBORNE'S PROCESS.)

UNITED STATES PATENT OFFICE.

CHARLES P. BOWEN, OF SILVER CITY, IDAHO TERRITORY.

IMPROVEMENT IN GOVERNORS.

Specification forming part of Letters Patent No. 120,366, dated October 31, 1871; reissue No. 4,931, dated June 4, 1872.

Specification describing a new and useful Improvement in Governors for Steam and other Engines, invented by CHARLES P. BOWEN, of Silver City, in the county of Owyhee and Territory of Idaho.

My invention consists of a cylindrical valve in two parts, and a double-acting operating gear therefor, by which the said two parts of the valve are worked in opposite directions in opening and closing the steam-passage, in such manner that the variations of the steam-passage are two-fold what they would be in a valve of a given size, actuated by the ordinary single-acting operating gear, thereby rendering the governor proportionately more sensitive to changes of steam or resistance of the machine. The invention also consists of a combination of a hollow or tubular valve-stem, and arms connecting it with the ball-arms, with the ordinary valve-stem and one of the parts of the two-part valve in such manner as to effect the said reverse motions of the two-part valve by a movement of the ball-arms. The invention also consists of a combination of a conical block with the steam-way and one of the parts of the valve in such manner as to throttle the steam in case the governor-belt breaks or runs off, and prevent the application of the full power of the steam, and yet not shut it off and stop the engine; and it also consists of a novel construction of the valve-case for adapting it to the two-part valve and the throttling-cone.

Referring to the accompanying drawing for a more complete explanation of my invention, *a* is the head or elbow of the pipe through which the steam passes to the cylinder, and within which the regulating-valve is situated. This valve consists of two metallic cylinders, *b* and *c*, placed one above the other in the pipe *a*, so as to move up and down in the line of their axes. In the present case the upper and lower ends of the cylinders *b* and *c*, respectively, are made plain, as shown; but the edges which are toward each other are curved or corrugated. The pipe *a* is grooved around the inside at the point *e* where the cylinders meet, and which is also just opposite the steam-entering pipe, so that the steam can pass around the cylinders and enter the valve freely from all sides. Just below the cylinder *c* is a conical or semi-globular block, *d*, which is so secured in the steam-pipe that there will be a steam-passage around or nearly around it. This cone is so placed that when by any means the part *c* of the valve is at its lowest point, to which it falls when the regulator stops, it will encircle the upper part of the cone closely enough to impede the passage of the steam as much as desired, either to nearly stop the engine or to allow it only an ordinary rate of speed. An annular channel, *e'*, is formed in the case around the base of the cone to make ample space for steam when the valve is open. This device renders the engine safe even if the governor-belt should break, allowing the engine to continue to run and not wholly stop, so that it will not be necessary to start it with its load on, as would be the case if it were to be entirely stopped when the belt breaks. The upper part *b* of the valve is connected by the rod *f*, with the arms *j* of the governor-weights above their pivots at *u* in the ordinary way, and the lower part *c* is connected by the curved rod *h*, hollow spindle *g*, and connecting-rods *m*, with said arms *j* below their pivots, all in such manner that when the balls move in the direction to open the valves they move from each other, and open twice as much as a single or ordinary valve would with the same movement of the balls, and the effect is the same in respect of the closing movements. The arms *m m* are pinned to the arms *j*, and their lower ends are secured to a loosely-moving ring, *o*, on a collar, *p*, on the spindle *g*. By means of this ring the arms can revolve without turning the spindle, and the spindle is elevated and depressed by the movements of the weights in an opposite direction to the motion of the spindle *f*. This collar *p* screws up and down on spindle *g* for shifting the lower part of the valve relatively to the other.

Having thus described my invention, I claim as new and desire to secure by Letters Patent—

1. A governor-valve, comprising two cylindrical parts, *b c*, arranged for moving in opposite directions in opening and closing, substantially in the manner described.

2. The said two-part governor-valve connected to the ball-arms, the one above and the other below the pivots thereof, in such manner as to be moved in opposite directions by a movement of the said governor-arms, all substantially as specified.

3. The combination, with the said two-part valve and the ball-arm, of the connecting-rod *f*, tubular rod *g*, and the connecting-arms *m*, substantially in the manner described.

4. The combination, with the steam-way and part *c* of the valve, of the cone *d*, substantially as specified.

5. The combination of the two-part valve *b c*, head *a*, connecting-rods *f*, *g*, and *m*, and the ball-arms, all comprising a double-acting governor, substantially as specified.

CHARLES P. BOWEN.

Witnesses:
JNO. S. HALLENBECK,
T. W. JONES.